UNITED STATES PATENT OFFICE.

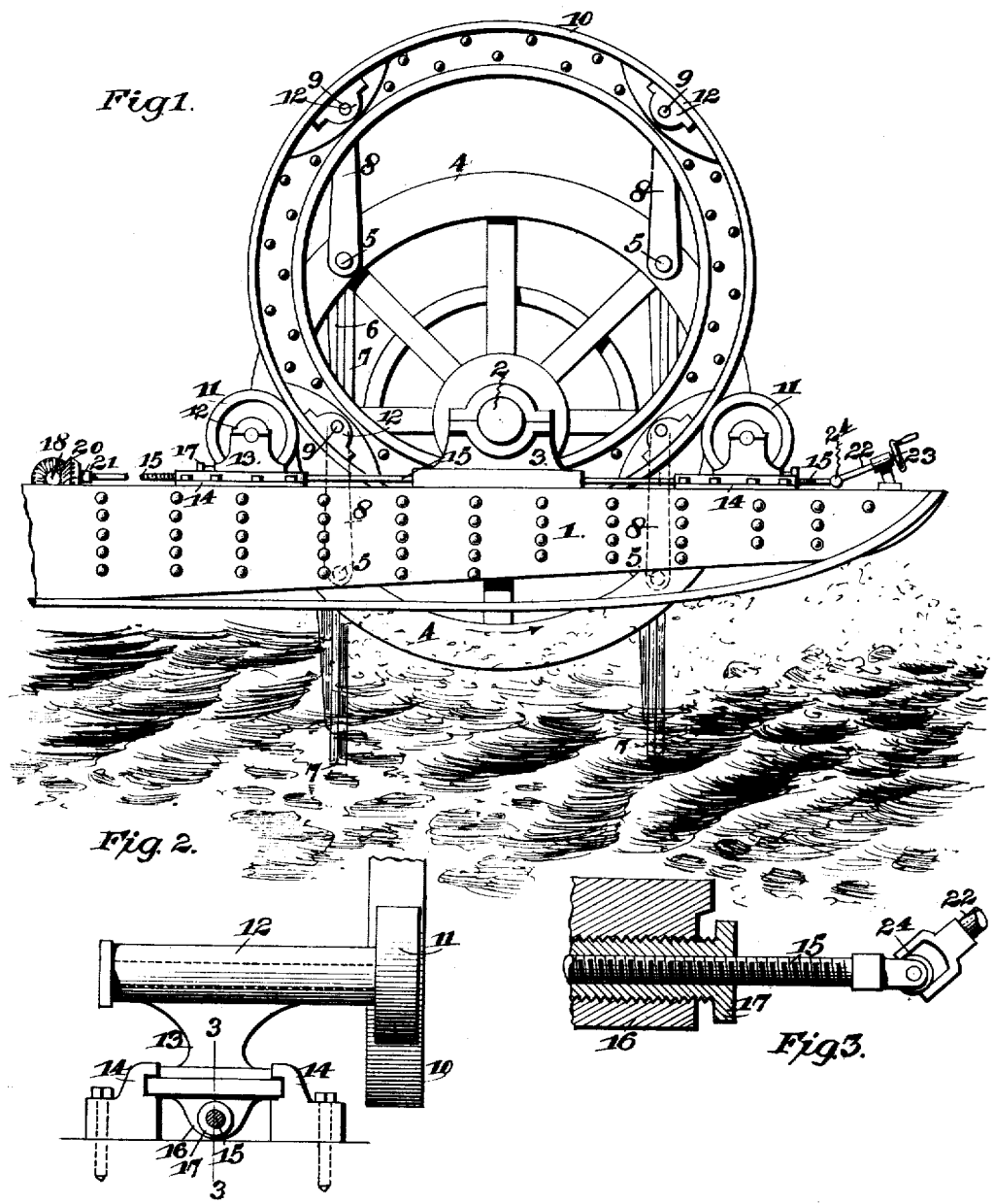

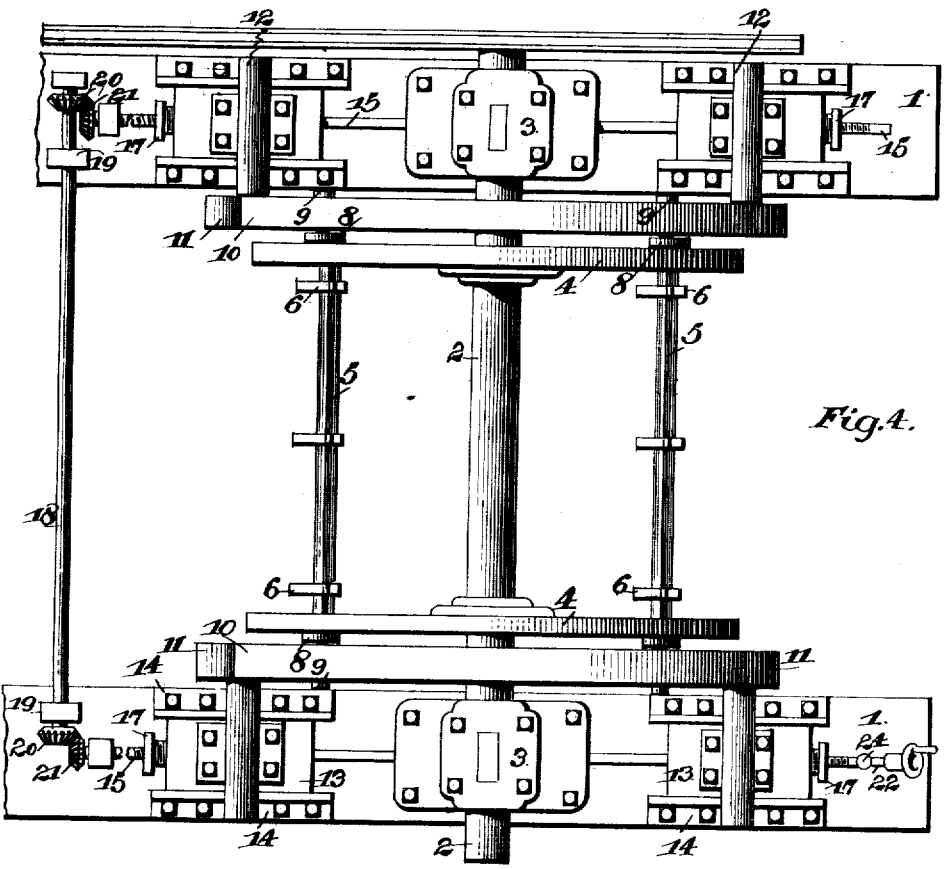
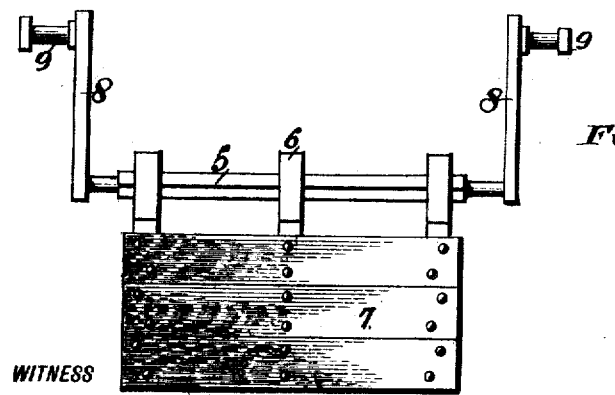

ROLLIE CALVIN HILL, OF MEMPHIS, TENNESSEE.

PROPELLING-WHEEL.

1,228,209. Specification of Letters Patent. Patented May 29, 1917.

Application filed September 14, 1916. Serial No. 120,037.

*To all whom it may concern:*

Be it known that I, ROLLIE CALVIN HILL, a citizen of the United States, and a resident of Memphis, in the county of Shelby and State of Tennessee, have invented a certain new and useful Improvement in Propelling-Wheels, of which the following is a specification.

My invention is an improvement in propelling wheels, and the invention has for its object to provide a wheel of the character specified wherein a series of blades or vanes is so mounted that the blades will enter the water in vertical position, will move in a line perpendicular to their planes throughout their contact with the water, and will again move vertically out of the water.

In the drawings:

Figure 1 is a side view of the improved propelling wheel;

Fig. 2 is a detail showing the mounting of the roller bearing for the guide wheel;

Fig. 3 is a section on the line 3—3 of Fig. 2;

Fig. 4 is a top plan view of the wheel, and

Fig. 5 is a front view of one of the blades or vanes.

The present embodiment of the invention is mounted on supporting rails 1, the said rails being spaced apart from each other and being connected with a vessel or the like in such manner that the vanes of the wheel, to be later described, may engage the water, to propel the vessel. A shaft 2 is journaled in bearings 3 on the rails and to this shaft wheels 4 are secured in spaced relation, the said wheels consisting of hubs and arms connected by spokes, the hubs being secured to the shaft to turn therewith.

A series of shafts 5 is journaled in the wheels parallel with the shaft 2, the said shafts being four in number and in the present instance being arranged at angular intervals of ninety degrees with respect to each other. To each shaft is connected a blade or vane, each shaft, as shown in Figs. 4 and 5, having a portion intermediate its ends polygonal in cross section. Arms 6 are held on the polygonal portions, the said arms having openings fitting the said portions. Boards are secured to the arms, and the said boards form the vanes 7.

At the end of each shaft 5 is arranged a rotatable arm 8, the said arms being in the same plane, and having journal pins 9 at their ends. These arms 8 extend in opposite directions to the vanes or blades and the said arms are connected with mechanism for feathering the blades or vanes. The said mechanism comprises rings 10, one of the rings being secured at the outer side of each wheel 4, and the said rings are supported by rollers 11 which are mounted in a manner to be presently described. Each of these rings 10 is provided with four bearings 12 at its periphery, and the journal pins 9 are journaled in the bearings. The bearings are spaced at angular intervals of ninety degrees, and each ring 10 is mounted to revolve about the shaft 2 on the rollers 11, the ring being eccentric to the shaft as shown.

In operation, when the shaft 2 is rotated by any form of motor, the wheel 4 will be rotated and the shafts 5 will be revolved about the shaft 2. As the wheels 4 rotate the rings 10 will be revolved, following the wheels 4 in their movement, because of the connection between the wheels and the rings, namely, the arms 8. The rings 10 are so arranged with respect to the wheels that because of the connecting arms 8, the said rings must always occupy a certain predetermined relation with respect to the wheels 4, and since the rings are of the same diameter as the wheels 4, they will move at the same speed. All of the blades must always retain the same position, regardless of their position with respect to the shaft 2; hence each blade will enter the water in a vertical position, will move through the water in a vertical position, and will leave the water in a vertical position, offering thus a minimum of resistance to the entering and leaving movements, and offering a maximum of propelling effect as it moves through the water.

The position of each ring 10 is limited fore and aft as well as downwardly by rollers 11, and the arms 8 prevent the ring from rising so that the said rings are held in predetermined and fixed position, as far as bodily movement is concerned.

The bearings 12 for the rollers 11 have carriages 13 which slide in guides 14 on the rails 1, and these carriages may be simultaneously moved by means of the mechanism shown in Figs. 1 to 4. The said mechanism comprises rods 15, each of which has threaded portions near its ends. These threaded portions pass through openings in depending lugs 16 on the carriages between the guides and in each opening is threaded a nut 17 through which the rod 15 is threaded, thus the rod is connected to the carriages at each side. On the inner side of the wheel a shaft 18 is journaled transversely of the rails in bearings 19, and this shaft is provided with bevel gears 20 which mesh with bevel gears 21 on the rods.

An operating shaft 22 is journaled in an inclined position in a bearing bracket 23, and one end of the said shaft is connected to the adjacent rod by a universal joint 24, as shown in Fig. 3. The shaft has a hand wheel, and it is obvious that when the shaft is rotated by means of the hand wheel, both rods 15 will be rotated and, since the opposite threaded portions of each rod 15 are of different pitch, that is, there being a normal thread per inch at one end and a lesser number at the other end, the carriages at each side will be simultaneously moved toward or from rod 18 at different rates of speed. By this means, the position of the rings 10 may be altered sufficiently to raise or lower the propelling vanes, and the said rings may be relatively lowered enough to lift the propelling vanes entirely out of the water, by altering their relative angular position.

I claim:

1. A propeller comprising a wheel consisting of spaced frames, shafts journaled in the frames between the same, at spaced intervals, vanes secured to the shafts, each shaft having a pair of radial arms, and rings at the outer side of each frame and of equal radius and mounted above the wheel, said arms being journaled at their outer ends in the adjacent rings and normally holding the vanes vertical, means for supporting the rings for rotation with the wheel, and means in connection with said supporting means for altering the position of the rings with respect to the wheel, said means comprising rollers upon which the rings are mounted to rotate, carriages upon which the rollers are mounted, guides for the carriages, and means for moving the carriages at each end toward and from said rings.

2. A propeller wheel comprising a wheel having pivotally mounted vanes, and arms rigid with the vanes, a ring mounted for rotation at each end of the wheel, and in which the arms are journaled, said rings rotating with the wheel and being of equal radius to hold the vanes parallel with each other, and means for simultaneously altering the position of the rings with respect to the wheel, said means comprising rollers upon which the rings are mounted to rotate, carriages upon which the rollers are mounted, guides for the carriages, and means for moving the carriages at each end toward and from the rings.

ROLLIE CALVIN HILL.

Copies of this patent may be obtained for five cents each, by addressing the "Commissioner of Patents, Washington, D. C."